United States Patent
Shintani et al.

(10) Patent No.: US 10,795,022 B2
(45) Date of Patent: Oct. 6, 2020

(54) 3D DEPTH MAP

(71) Applicants: Sony Corporation, Tokyo (JP); Sony Interactive Entertainment Inc., Tokyo (JP)

(72) Inventors: Peter Shintani, San Diego, CA (US); Morio Usami, Tokyo (JP); Kissei Matsumoto, Yokosuka (JP); Kazuyuki Shikama, Tokyo (JP); Bibhudendu Mohapatra, San Diego, CA (US); Keith Resch, San Diego, CA (US)

(73) Assignees: SONY CORPORATION, Tokyo (JP); Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/590,497

(22) Filed: May 9, 2017

(65) Prior Publication Data
US 2018/0252815 A1    Sep. 6, 2018

Related U.S. Application Data (60) Provisional application No. 62/466,013, filed on Mar. 2, 2017.

(51) Int. Cl.
| | | |
|---|---|---|
| *G01S 17/89* | (2020.01) | |
| *H04N 13/128* | (2018.01) | |
| *G06F 16/95* | (2019.01) | |
| *G01S 17/87* | (2020.01) | |
| *G01S 17/10* | (2020.01) | |

(Continued)

(52) U.S. Cl.
CPC .............. *G01S 17/89* (2013.01); *G01S 17/10* (2013.01); *G01S 17/87* (2013.01); *G06F 16/95* (2019.01); *G06K 9/00208* (2013.01); *G06K 9/6273* (2013.01); *G06T 17/00* (2013.01);

(Continued)

(58) Field of Classification Search
None
See application file for complete search history.

(56) References Cited

U.S. PATENT DOCUMENTS

| | | |
|---|---|---|
| 5,228,069 A | 7/1993 | Arenson et al. |
| 6,291,816 B1 | 9/2001 | Liu |

(Continued)

FOREIGN PATENT DOCUMENTS

| | | |
|---|---|---|
| EP | 2225699 A1 | 9/2010 |
| EP | 2730939 A2 | 5/2014 |
| EP | 2339532 B1 | 4/2015 |

OTHER PUBLICATIONS

Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", related U.S. Appl. No. 15/383,392, Non-Final Office Action dated Apr. 19, 2018.

(Continued)

*Primary Examiner* — David Perlman
(74) *Attorney, Agent, or Firm* — John L. Rogitz (57) ABSTRACT

Machine learning is applied to both 2D images from an infrared imager imaging laser reflections from an object and to the 3D depth map of the object that is generated using the 2D images and time of flight (TOF) information. In this way, the 3D depth map accuracy can be improved without increasing laser power or using high resolution imagers.

13 Claims, 6 Drawing Sheets

(51) Int. Cl.
  *G06T 17/00*     (2006.01)
  *G06K 9/00*      (2006.01)
  *H04N 13/254*    (2018.01)
  *G06K 9/62*      (2006.01)
  *H04N 13/271*    (2018.01)

(52) U.S. Cl.
  CPC ......... *H04N 13/128* (2018.05); *H04N 13/254* (2018.05); *H04N 13/271* (2018.05)

(56) References Cited

U.S. PATENT DOCUMENTS

| | | |
|---|---|---|
| 6,420,698 B1 | 7/2002 | Dimsdale |
| 6,442,465 B2 | 8/2002 | Breed et al. |
| 6,664,501 B1 | 12/2003 | Troitski |
| 6,970,183 B1 | 11/2005 | Monroe |
| 7,184,088 B1 | 2/2007 | Ball |
| 7,262,854 B2 | 8/2007 | Imura |
| 7,752,483 B1 | 7/2010 | Muresan et al. |
| 7,791,009 B2 | 9/2010 | Johnston et al. |
| 8,730,309 B2 | 5/2014 | Wilson et al. |
| 8,780,113 B1 | 7/2014 | Ciurea et al. |
| 8,803,950 B2 | 8/2014 | Ren et al. |
| 8,824,827 B2 | 9/2014 | Quan et al. |
| 8,830,555 B2 | 9/2014 | Aksamit et al. |
| 9,031,356 B2 | 5/2015 | Kunkel et al. |
| 9,098,908 B2 | 8/2015 | Kirk et al. |
| 9,214,492 B2 | 12/2015 | Tempel et al. |
| 9,235,928 B2 | 1/2016 | Medioni et al. |
| 9,262,691 B2 | 2/2016 | Kang et al. |
| 9,275,302 B1 | 3/2016 | Yan et al. |
| 9,286,694 B2 | 3/2016 | Kim et al. |
| 9,319,139 B2 | 4/2016 | Effenberger et al. |
| 9,405,008 B2 | 8/2016 | Raskar et al. |
| 9,426,450 B1 | 8/2016 | Zhang et al. |
| 9,435,891 B2 | 9/2016 | Oggier |
| 9,483,835 B2 | 11/2016 | Liang et al. |
| 9,542,749 B2 | 1/2017 | Freedman et al. |
| 9,557,166 B2 | 1/2017 | Thuries et al. |
| 9,618,613 B2 | 4/2017 | Murakami et al. |
| 9,760,837 B1* | 9/2017 | Nowozin ............ G06N 99/005 |
| 9,806,813 B2 | 10/2017 | Liu et al. |
| 9,858,673 B2 | 1/2018 | Ciurea et al. |
| 9,860,618 B2 | 1/2018 | Liu et al. |
| 9,995,578 B2 | 6/2018 | Ge et al. |
| 10,142,612 B2 | 11/2018 | Ge et al. |
| 2004/0141170 A1 | 7/2004 | Jamieson et al. |
| 2004/0141753 A1 | 7/2004 | Euw et al. |
| 2004/0208272 A1 | 10/2004 | Moursund et al. |
| 2005/0031166 A1 | 2/2005 | Fujimura et al. |
| 2005/0207755 A1 | 9/2005 | Rabbat et al. |
| 2005/0226214 A1 | 10/2005 | Keslassy et al. |
| 2006/0221241 A1 | 10/2006 | Okumichi et al. |
| 2006/0239558 A1 | 10/2006 | Rafii et al. |
| 2007/0024614 A1 | 2/2007 | Tam et al. |
| 2007/0279415 A1 | 12/2007 | Sullivan et al. |
| 2008/0152247 A1 | 6/2008 | Oh et al. |
| 2009/0080885 A1 | 3/2009 | Mehrotra et al. |
| 2009/0190853 A1 | 7/2009 | Noh |
| 2010/0302365 A1 | 12/2010 | Finocchio et al. |
| 2011/0025843 A1 | 2/2011 | Oggier et al. |
| 2011/0188773 A1 | 8/2011 | Wei et al. |
| 2011/0243570 A1 | 10/2011 | Kim et al. |
| 2012/0032833 A1 | 2/2012 | Milligan et al. |
| 2012/0044476 A1 | 2/2012 | Earhart et al. |
| 2012/0056982 A1* | 3/2012 | Katz ..................... G06F 3/017 348/43 |
| 2012/0069009 A1 | 3/2012 | Shimoyama et al. |
| 2012/0168605 A1 | 7/2012 | Milanovic et al. |
| 2012/0182394 A1 | 7/2012 | Bae et al. |
| 2012/0248514 A1 | 10/2012 | Korekado et al. |
| 2012/0249544 A1 | 10/2012 | Maciocci et al. |
| 2012/0293615 A1 | 11/2012 | Chen et al. |
| 2012/0306876 A1 | 12/2012 | Shotton et al. |
| 2013/0051516 A1 | 2/2013 | Yang et al. |
| 2013/0129224 A1 | 5/2013 | Katz et al. |
| 2013/0195083 A1 | 8/2013 | Kim et al. |
| 2013/0207970 A1 | 8/2013 | Shpunt et al. |
| 2013/0278604 A1 | 10/2013 | Georgis et al. |
| 2013/0293684 A1 | 11/2013 | Becker et al. |
| 2013/0329012 A1 | 12/2013 | Bartos et al. |
| 2014/0058367 A1 | 2/2014 | Dantus |
| 2014/0079288 A1 | 3/2014 | Lee et al. |
| 2014/0092221 A1 | 4/2014 | Nagai |
| 2014/0168424 A1* | 6/2014 | Attar ..................... G01C 3/10 348/140 |
| 2014/0198977 A1 | 7/2014 | Narasimha et al. |
| 2014/0226984 A1 | 8/2014 | Roberts et al. |
| 2014/0240467 A1* | 8/2014 | Petyushko ............ H04N 5/232 348/47 |
| 2014/0253679 A1 | 9/2014 | Guigues et al. |
| 2014/0253691 A1 | 9/2014 | Holz |
| 2014/0267234 A1 | 9/2014 | Hook et al. |
| 2014/0293993 A1 | 10/2014 | Ryhorchuk |
| 2014/0323148 A1 | 10/2014 | Schmalstieg et al. |
| 2014/0333728 A1* | 11/2014 | Navab ..................... G01S 7/497 348/47 |
| 2014/0355901 A1 | 12/2014 | Tezaur |
| 2014/0375851 A1 | 12/2014 | Lee et al. |
| 2014/0376768 A1 | 12/2014 | Troy et al. |
| 2015/0002636 A1* | 1/2015 | Brown ................. H04N 13/254 348/47 |
| 2015/0022643 A1 | 1/2015 | Stetson et al. |
| 2015/0025336 A1 | 1/2015 | Blassnig et al. |
| 2015/0036926 A1 | 2/2015 | Choi et al. |
| 2015/0070489 A1 | 3/2015 | Hudman et al. |
| 2015/0130903 A1 | 5/2015 | Thompson et al. |
| 2015/0130904 A1 | 5/2015 | Bae et al. |
| 2015/0171968 A1 | 6/2015 | Featherston et al. |
| 2015/0248765 A1 | 9/2015 | Criminisi et al. |
| 2015/0254811 A1 | 9/2015 | Sahu et al. |
| 2015/0294686 A1 | 10/2015 | Autioniemi |
| 2015/0309663 A1* | 10/2015 | Seo ..................... G06F 3/0421 345/175 |
| 2015/0339471 A1 | 11/2015 | Bennett et al. |
| 2015/0371393 A1 | 12/2015 | Ramachandra et al. |
| 2015/0373322 A1 | 12/2015 | Goma et al. |
| 2015/0378023 A1 | 12/2015 | Royo et al. |
| 2016/0012633 A1* | 1/2016 | Wei ..................... G06T 17/05 345/420 |
| 2016/0097851 A1 | 4/2016 | Zhang et al. |
| 2016/0098847 A1 | 4/2016 | Crnokrak |
| 2016/0099777 A1 | 4/2016 | Liu et al. |
| 2016/0124089 A1 | 5/2016 | Meinherz et al. |
| 2016/0173869 A1 | 6/2016 | Wang et al. |
| 2016/0191759 A1 | 6/2016 | Somanath et al. |
| 2016/0239725 A1* | 8/2016 | Liu ..................... G06T 7/60 |
| 2016/0283774 A1 | 9/2016 | Buchanan et al. |
| 2016/0291160 A1 | 10/2016 | Zweigle et al. |
| 2016/0307367 A1* | 10/2016 | Chuang ................. G06T 17/205 |
| 2016/0328828 A1 | 11/2016 | Zhang et al. |
| 2016/0344967 A1* | 11/2016 | Barnes ................. H04N 5/3728 |
| 2017/0061701 A1 | 3/2017 | Mittal et al. |
| 2017/0188017 A1 | 6/2017 | Hall |
| 2017/0201738 A1 | 7/2017 | Lacaze et al. |
| 2017/0213356 A1 | 7/2017 | Park |
| 2017/0264880 A1 | 9/2017 | Zolotov |
| 2017/0277180 A1 | 9/2017 | Baer et al. |
| 2017/0280125 A1* | 9/2017 | Brown ..................... G06T 7/62 |
| 2017/0332750 A1 | 11/2017 | Gharabegian |
| 2017/0372527 A1 | 12/2017 | Murali et al. |
| 2017/0374342 A1 | 12/2017 | Zhao |
| 2018/0033357 A1 | 2/2018 | Li et al. |
| 2018/0034579 A1 | 2/2018 | Liu et al. |
| 2018/0053284 A1 | 2/2018 | Rodriguez et al. |
| 2018/0100928 A1 | 4/2018 | Keilaf et al. |
| 2018/0124371 A1 | 5/2018 | Kamal et al. |
| 2018/0173990 A1 | 6/2018 | Shintani et al. |
| 2018/0176483 A1 | 6/2018 | Knorr et al. |

(56) References Cited

U.S. PATENT DOCUMENTS

2018/0190014 A1* 7/2018 Yarborough ............ G06T 17/05
2018/0234617 A1 8/2018 Przyborski

OTHER PUBLICATIONS

Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", related U.S. Appl. No. 15/383,392, Applicant's response to Non-Final Office Action filed Apr. 25, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Non-Final Office Action dated Apr. 5, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Applicant's response to Non-Final Office Action filed Apr. 16, 2018.

Derek Chan, Hylke Buisman, Christian Theobalt, Sebastian Thrun, "A Noise-Aware Filter for Real-Time Depth Upsampling", Oct. 5, 2008, retrieved from https://hal.inria.fr/inria-00326784.

Ho, Edmond S.L. et al., "Improving Posture Classification Accuracy for Depth Sensor-Based Human Activity Monitoring in Smart Environments", Jul. 2016, retrieved from http://www.sciencedirect.com/science/article/pii/S1077314216000138.

Quang H. Nguyen, Minh N. Do, Sanjay J. Patel, "Depth image-based rendering from multiple cameras with 3D propagation algorithm", May 27, 2009.

Riegler et al., "A Deep Primal-Dual Network for Guided Depth Super-Resolution", Institute for Computer Graphics and Vision, Graz University of TechnologyAustria, Jul. 28, 2016.

Schuon et al., "High-Quality Scanning Using Time-of-Flight Depth Superresolution", Stanford University, 2008.

Shuran Song, Jianxiong Xiao, "Sliding Shapes for 3D Object Detection in Depth Images", Abstract, Sep. 2014.

Yo-Sung Ho, Yun-Suk Kang, "Multi-View Depth Generation using Multi-Depth Camera System", Gwangju Institute of Science and Technology, Jan. 4, 2016.

Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", file history of related U.S. Appl. No. 15/383,392, filed Dec. 19, 2016.

Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", file history of related U.S. Appl. No. 15/370,197, filed Dec. 6, 2016.

Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map", file history of related U.S. Appl. No. 15/371,433, filed Dec. 7, 2016.

Peter Shintani, Jose Omar Gonzalez Hernandez, William Clay, Pablo Antonio Espinosa, Fred Ansfield, Bibhudendu Mohapatra, Keith Resch, Morio Usami, "Using Multiple Cameras to Stitch a Consolidated 3D Depth Map", file history of related U.S. Appl. No. 15/383,683, filed Dec. 19, 2016.

Peter Shintani, Jose Omar Gonzalez Hernandez, William Clay, Pablo Antonio Espinosa, Fred Ansfield, Bibhudendu Mohapatra, Keith Resch, Morio Usami, "Using Micro Mirrors to Improve the Field of View of a 3D Depth Map", file history of related U.S. Appl. No. 15/432,674, filed Feb. 14, 2017.

Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", file history of related U.S. Appl. No. 15/477,369, filed Apr. 3, 2017.

Nathan Silberman, Rob Fergus, "Indoor Scene Segmentation using a Structured Light Sensor", Dept. of Computer Science, Nov. 6, 2011, Courant Institute, New York University, pp. 601-608.

Daniel Freedman, Eyal Krupka, Yoni Smolin, Ido Leichter, Mirko Schmidt, "SRA: Fast Removal of General Multipath for ToF Sensors", Microsoft Research, Microsoft Corporation, Mar. 24, 2014.

Peter Shintani, Morio Usami, Kazuyuki Shikama, Keith Resch, "Generating 3D Depth Map Using Parallax", file history of related U.S. Appl. No. 15/798,914, filed Oct. 31, 2017.

Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Final Office Action dated Sep. 10, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Applicant's response to Final Office Action filed Sep. 12, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", related U.S. Appl. No. 15/383,392, Final Office Action dated Sep. 12, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Final Office Action dated Aug. 23, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Applicant's response to Final Office Action filed Sep. 4, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Non-Final Office Action dated Jun. 21, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Applicant's response to Non-Final Office Action filed Jun. 27, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", related U.S. Appl. No. 15/383,392, Applicant's response to Final Office Action filed Sep. 14, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Using Multiple Cameras to Stitch a Consolidated 3D Depth Map", related U.S. Appl. No. 15/383,683, Non-Final Office Action dated Jul. 12, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Using Multiple Cameras to Stitch a Consolidated 3D Depth Map", related U.S. Appl. No. 15/383,683, Applicant's response to Non-Final Office Action filed Jul. 16, 2018.

Michael Taylor, Glenn Black, Javier Fernandez Rico, "Multipoint Slam Capture", file history of related U.S. Appl. No. 16/019,140, filed Jun. 26, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Non-Final Office Action dated Dec. 27, 2018.

Jinbeum Jang, Sangwoo Park, Jieun Jo, Joonki Paik, "Depth map generation using a single image sensor with phase masks", Image (56) References Cited

OTHER PUBLICATIONS

Processing and Intelligent System Laboratory Graduate School of Advanced Imaging Science and Film, Chung-Ang University, Seoul, South Korea, Optical Society of America, 2016.

Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Applicant's response to Non-Final Office Action filed Jan. 4, 2019.

Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map", related U.S. Appl. No. 15/371,433, Non-Final Office Action dated Jan. 10, 2019.

Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map", related U.S. Appl. No. 15/371,433, Applicant's response to Non-Final Office Action filed Jan. 17, 2019.

Peter Shintani, Jose Omar Gonzalez Hernandez, William Clay, Pablo Antonio Espinosa, Fred Ansfield, Bibhudendu Mohapatra, Keith Resch, Morio Usami, "Using Micro Mirrors to Improve the Field of View of a 3D Depth Map", related U.S. Appl. No. 15/432,674, Non-Final Office Action dated Feb. 14, 2019.

Peter Shintani, Jose Omar Gonzalez Hernandez, William Clay, Pablo Antonio Espinosa, Fred Ansfield, Bibhudendu Mohapatra, Keith Resch, Morio Usami, "Using Micro Mirrors to Improve the Field of View of a 3D Depth Map", related U.S. Appl. No. 15/432,674, Applicant's response to Non-Final Office Action filed Feb. 20, 2019.

Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Final Office Action dated Feb. 11, 2019.

Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Applicant's response to Final Office Action filed Feb. 21, 2019.

Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map", related U.S. Appl. No. 15/371,433, Final Office Action dated Apr. 2, 2019.

Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map ", related U.S. Appl. No. 15/371,433, Applicant's response to Final Office Action filed Apr. 15, 2019.

Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Non-Final Office Action dated Mar. 21, 2019.

Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Applicant's response to Non-Final Office Action filed Apr. 1, 2019.

He et al, "Iterative Transduction Learning for Automatic Image Segmentation and Matting with RGB-D Data", Elsevier, Mar. 2014.

Jang et al, "Depth Map Generation Using a Single Image Sensor with Phase Masks", Chang-Ang University, Seoul, South Korea, Jun. 2016.

Kim et al, "Multi-focusing and Depth Estimation Using a Color Shift Model-Based Computational Camera", IEEE Transactions on Image Processing, vol. 21, No. 9, Sep. 2012.

Li et al, "Brain-Inspired Framework for Fusion of Multiple Depth Cues", IEEE Transactions on Circuits and Systems for Video Technology, vol. 23, No. 7, Jul. 2013.

Roy et al, "Denoising 3D Models with Attributes Using Soft Thresholding", Bourgogne University, France, 2004.

Shintani et al, "Color Noise Reduction in 3D Depth Map", related U.S. Appl. No. 15/371,433, Non-Final Office Action dated Jun. 21, 2019.

Shintani et al, "Color Noise Reduction in 3D Depth Map", related U.S. Appl. No. 15/371,433, Non-Final Office Action response filed Jun. 28, 2019.

Shintani et al, "Using Micro Mirrors to Improve the Field of View of a 3D Depth Map", related U.S. Appl. No. 15/432,674, Final Office Action dated May 3, 2019.

Shintani et al, "Using Micro Mirrors to Improve the Field of View of a 3D Depth Map", related U.S. Appl. No. 15/432,674, Applicant's response to Final Office Action filed May 31, 2019.

Shintani et al, "Using Super Imposition to Render a 3D Depth Map", related U.S. Appl. No. 15/477,369, Applicant's Reply Brief filed May 29, 2019.

Shintani et al, "Using Super Imposition to Render a 3D Depth Map", related U.S. Appl. No. 15/477,369, Examiner's Answer dated May 13, 2019.

Shintani et al., "Generating 3D Depth Map Using Parallax", related U.S. Appl. No. 15/798,914, Applicant's response to Non-Final Office Action filed Jul. 12, 2019.

Shintani et al., "Generating 3D Depth Map Using Parallax", related U.S. Appl. No. 15/798,914, Non-Final Office Action dated Jul. 9, 2019.

* cited by examiner

3D DEPTH MAP

This application claims priority to U.S. provisional patent application No. 62/466,013, filed Mar. 2, 2017, incorporated herein by reference.

FIELD

The present application relates to technically inventive, non-routine solutions that are necessarily rooted in computer technology and that produce concrete technical improvements.

BACKGROUND

When multiple computerized devices interact with each other at close range, they may employ sensors such as cameras and laser range finders to map their environment. As understood herein, three dimensional (3D) depth maps may be generated by each device of the other devices or objects within line of sight. Such 3D depth maps are generated typically using "time of flight" principles, i.e., by timing the periods from laser transmission to reception of each reflection, with regions of an object further away taking longer for the light to propagate to it and then return to a detector. The time of flight for each detected reflection by a sensor, typically a complementary metal oxide semiconductor (CMOS) camera, is converted to distance to generate the depth map.

As understood herein, a problem with time of flight 3D camera mapping systems is the illumination of the camera's field of view by a laser. As the distance increases (depth), the reflected laser power drops so the noise increases. This means that the accuracy of the depth map decreases and the measurement time increases (averaging). A brute force response to this problem would be to increase the illumination by increasing the laser power, but this method raises safety issues and power consumption issues.

SUMMARY

To improve 3D depth map resolution without increasing laser power, machine learning is applied to depth map images to improve the accuracy of a 3D depth mapping system. Machine learning, which includes convolutional neural networks, improves the image processing by applying image recognition for classification. By classifying an imaged object, improved images can be produced since the system can determine what an object is from a lower resolution imager. Once the system classifies an object, artifacts such as noise or incorrect bit depth are removed resulting in an improved image. The classification can also be applied to a non-3D imager, and the information can be combined. In other words, machine learning may be used either on the 2D image from the camera or the 3D depth map generated by applying depth information (TOF information) to associated pixels of the 2D image, and the results combined. The system can learn/train in real time and its library of classified objects can increase over time, so the speed and accuracy of the system also improves with time. The library of classified objects can be preprogrammed with some basic objects as a starting point. By applying machine learning to images involved in producing 3D depth maps, the need to have a high resolution 3D depth mapping sensor or a higher power consumption for illumination is reduced.

Accordingly, a device includes a computer medium that is not a transitory signal and that comprises instructions executable by a processor to access a machine learning algorithm (MLA), process a representation of an object using the MLA to render an output, and use the output to render a three dimensional (3D) depth map.

In examples, the representation is a two dimensional (2D) image of the object. In other examples, the representation is a three dimensional (3D) depth map of the object.

If desired, the instructions may be executable to input to the MLA a training set of classified images, and to modify MLA processing by inputting to the MLA a test set of unclassified images. In some example embodiments, the instructions are executable to classify the representation of the object using the MLA to render a classification, and use the classification to modify the representation.

In another aspect, an assembly includes plural computerized devices. Each computerized device includes a laser emitter configured to output signals useful for generating a three dimensional (3D) depth map. One or more of the computerized devices are programmed with instructions to access a machine learning algorithm (MLA) and to process a representation of an object using the MLA to render an output. The instructions are executable to use the output to render a three dimensional (3D) depth map.

In another aspect, a method includes using a laser for illuminating an object. The method includes using a camera to receive reflections from the object and using the reflections to generate a representation of the object. The method further includes modifying the representation using a neural network to render a modified representation, and using the modified representation, establishing a three dimensional (3D) depth map of the object.

The details of the present application, both as to its structure and operation, can be best understood in reference to the accompanying drawings, in which like reference numerals refer to like parts, and in which:

DETAILED DESCRIPTION

This disclosure relates generally to computer ecosystems including aspects of multiple computerized devices. A system herein including computerized devices may include server and client components, connected over a network such that data may be exchanged between the client and server components. The client components may include one or more computing devices such as portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a UNIX operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community including but not limited to social networks to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers. A processor may be implemented by a digital signal processor (DSP), for example.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optic and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example computerized device 12.

The computerized device 12 may be an Android®-based system. The computerized device 12 alternatively may also include a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the computerized device 12 and/or other computers described herein is configured to undertake present principles (e.g. communicate with other CE devices to undertake present principles, execute the logic described herein, and perform any other functions and/or operations described herein).

Figure 1:
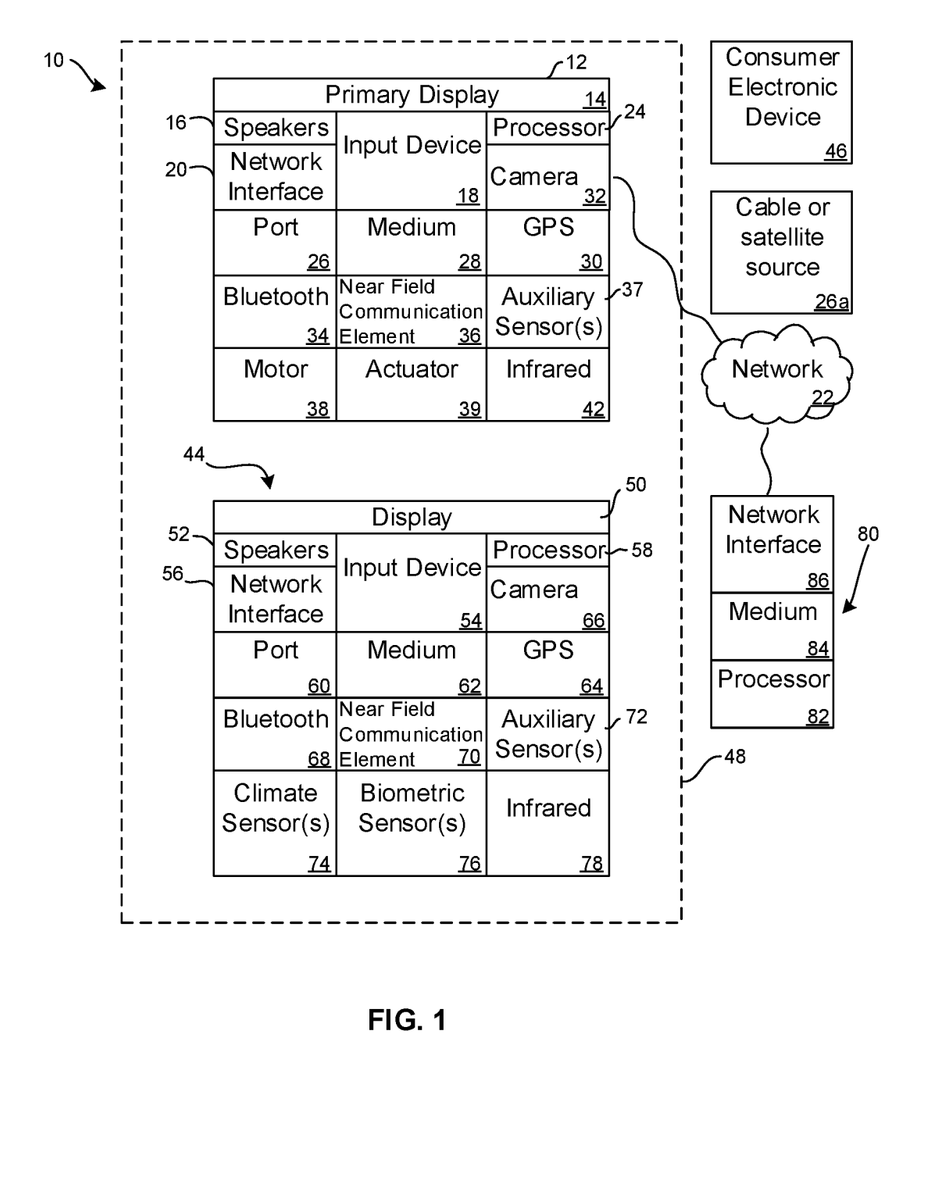
FIG. 1 is a block diagram of an example device.

Accordingly, to undertake such principles the computerized device 12 can be established by some or all of the components shown in FIG. 1. For example, the computerized device 12 can include one or more displays 14 that may be implemented by a high definition or ultra-high definition "4K" or higher flat screen and that may or may not be touch-enabled for receiving user input signals via touches on the display. The computerized device 12 may include one or more speakers 16 for outputting audio in accordance with present principles, and at least one additional input device 18 such as e.g. an audio receiver/microphone for receiving input sound including but not limited to audible commands to the computerized device 12 to control the computerized device 12. The example computerized device 12 may also include one or more network interfaces 20 for communication over at least one network 22 such as the Internet, a WAN, a LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the computerized device 12 to undertake present principles, including the other elements of the computerized device 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the computerized device 12 may also include one or more input ports 26 such as, e.g., a high definition multimedia interface (HDMI) port or a USB port to physically connect (e.g. using a wired connection) to another CE device and/or a headphone port to connect headphones to the computerized device 12 for presentation of audio from the computerized device 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below.

The computerized device 12 may further include one or more computer memories 28 such as disk-based or solid state storage that are not transitory signals, in some cases embodied in the chassis of the device as standalone devices or as a personal video recording device (PVR) or video disk player either internal or external to the chassis of the device for playing back AV programs or as removable memory media. Also in some embodiments, the computerized device 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the computerized device 12 is disposed in conjunction with the processor 24. However, it is to be understood that that another suitable position receiver other than a cellphone receiver, GPS receiver and/or altimeter may be used in accordance with present principles to e.g. determine the location of the computerized device 12 in e.g. all three dimensions.

In some embodiments the computerized device 12 may include one or more cameras 32 that may be, e.g., a thermal imaging camera, a digital camera such as a webcam, and/or a camera integrated into the computerized device 12 and controllable by the processor 24 to gather pictures/images and/or video in accordance with present principles. Also included on the computerized device 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the computerized device 12 may include one or more auxiliary sensors 37 (e.g., a motion sensor such as an accelerometer, gyroscope, cyclometer, or a magnetic sensor, an infrared (IR) sensor for receiving IR commands or other signals from a remote control or laser, an optical sensor, a speed and/or cadence sensor, a gesture sensor (e.g. for sensing gesture command), etc.) providing input to the processor 24. The computerized device 12 may include one or more motors 38, which may be a battery-powered motor, and one or more actuators 39 coupled to the motor 38 and configured to cause the device 12 to ambulate. In one example, the actuator 39 is a simple axle-and-wheel actuator that can be energized by the motor 38 to cause the device 12 to roll across a surface. In another example the actuator 39 may include one or more linear actuators with joints to cause the device 12 to move in a robotic, walking-type fashion on multiple legs. These are but two examples of motion actuators that can be included in the device 12.

In addition to the foregoing, it is noted that the computerized device 12 may also include an infrared (IR) transmitter and/or IR receiver and/or IR transceiver 42 such as a laser or an IR data association (IRDA) device. A battery (not shown) may be provided for powering the computerized device 12.

Still referring to FIG. 1, in addition to the computerized device 12, the system 10 may include one or more other computer device types that may include some or all of the components shown for the computerized device 12 and that may wirelessly communicate with the device 12 to control it. In one example, a first device 44 and a second device 46 are shown and may include similar components as some or all of the components of the computerized device 12. Fewer or greater devices may be used than shown.

In the example shown, to illustrate present principles all three devices 12, 44, 46 are assumed to be members of a local network in, e.g., a dwelling 48, illustrated by dashed lines.

The example non-limiting first device 44 may include one or more touch-sensitive surfaces 50 such as a touch-enabled video display for receiving user input signals via touches on the display. The first device 44 may include one or more speakers 52 for outputting audio in accordance with present principles, and at least one additional input device 54 such as e.g. an audio receiver/microphone for e.g. entering audible commands to the first device 44 to control the device 44. The example first device 44 may also include one or more network interfaces 56 for communication over the network 22 under control of one or more processors 58. Thus, the interface 56 may be, without limitation, a Wi-Fi transceiver, which is an example of a wireless computer network interface, including mesh network interfaces. It is to be understood that the processor 58 controls the first device 44 to undertake present principles, including the other elements of the first device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first device 44 may also include one or more input ports 60 such as, e.g., a HDMI port or a USB port to physically connect (e.g. using a wired connection) to another computer device and/or a headphone port to connect headphones to the first device 44 for presentation of audio from the first device 44 to a user through the headphones. The first device 44 may further include one or more tangible computer readable storage medium 62 such as disk-based or solid state storage. Also in some embodiments, the first device 44 can include a position or location receiver such as but not limited to a cellphone and/or GPS receiver and/or altimeter 64 that is configured to e.g. receive geographic position information from at least one satellite and/or cell tower, using triangulation, and provide the information to the device processor 58 and/or determine an altitude at which the first device 44 is disposed in conjunction with the device processor 58. However, it is to be understood that that another suitable position receiver other than a cellphone and/or GPS receiver and/or altimeter may be used in accordance with present principles to e.g. determine the location of the first device 44 in e.g. all three dimensions.

Continuing the description of the first device 44, in some embodiments the first device 44 may include one or more cameras 66 that may be, e.g., a thermal imaging camera, a digital camera such as a webcam, etc. Also included on the first device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first device 44 may include still other sensors such as e.g. one or more climate sensors 74 (e.g. barometers, humidity sensors, wind sensors, light sensors, temperature sensors, etc.) and/or one or more biometric sensors 76 providing input to the device processor 58. In addition to the foregoing, it is noted that in some embodiments the first device 44 may also include an infrared (IR) transmitter and/or IR receiver and/or IR transceiver 78 such as a laser or an IR data association (IRDA) device. A battery may be provided for powering the first device 44. The device 44 may communicate with the computerized device 12 through any of the above-described communication modes and related components.

The second device 46 may include some or all of the components described above.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers, controllers, and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
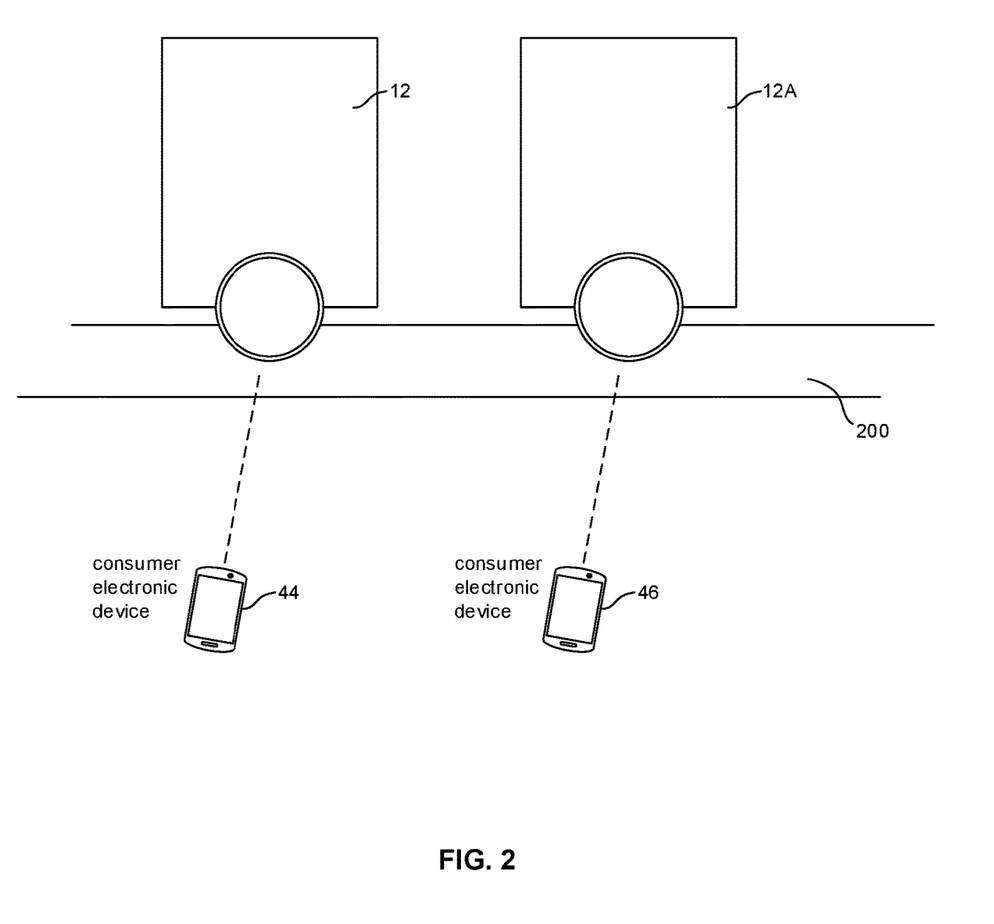
FIG. 2 is a block diagram of a system showing two devices, it being understood that more than two devices may be used.

FIG. 2 shows that multiple devices 12, 12A may be controlled by respective CE devices 44, 46 to interact on a surface 200 such as a flat planar surface.

Figure 3:
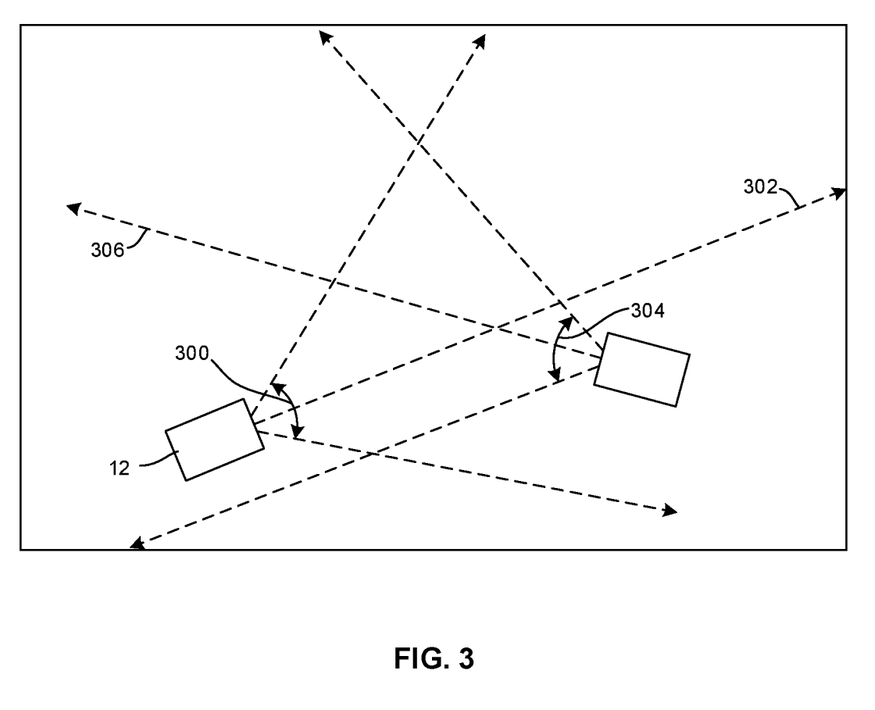
FIG. 3 is a schematic top view of two devices showing field of view of the devices.

FIG. 3 shows that the first device 12 may have a camera providing a field of view (FOV) with a FOV angle 300. The first device 12 may emit laser range-finding light such as IR light along one or more range finding axes 302. The camera may be implemented by a complementary metal oxide semiconductor (CMOS) camera that can detect both visible and infrared light so as to be able to produce still or video images along with detections of laser reflections for purposes of generating a depth map.

Likewise, the second device 12A may have a camera providing a field of view (FOV) with a FOV angle 304. The first device 12 may emit laser range-finding light such as IR light along one or more range finding axes 306. More than two devices may be used. In the example shown, each device is within the FOV of the other device, and the FOVs of the devices overlap as shown. The devices 12, 12A emitting their respective laser beams establish an optical micro-mesh.

Figure 4:
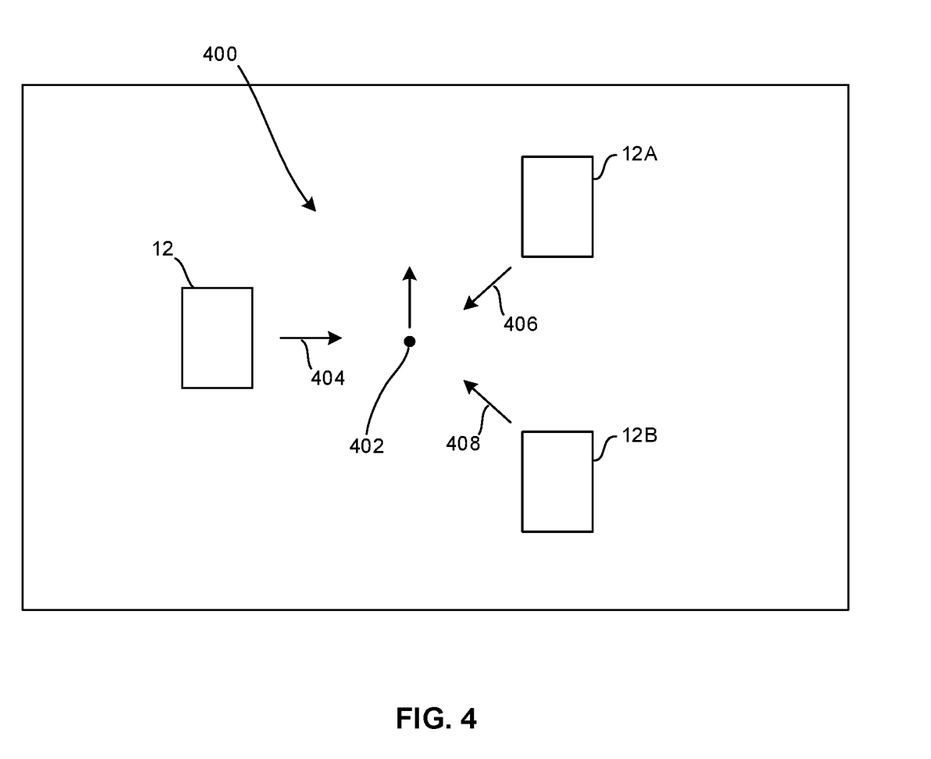
FIG. 4 is a schematic top view of three devices.

FIG. 4 illustrates a system 400 with three devices 12, 12A, 12B implemented by any of the devices described herein. As divulged further below, each device generates its own depth map by imaging the other devices within its field of view. The depth maps are aggregated together for a reference location that may be user-defined. In the example shown, the disclosure below assumes a reference location 402 located centrally in the system 400. Other reference locations may be modeled, including using one of the devices 12, 12A, 12B as a reference location. For description purposes, assume that the arrows 404, 406, 408 respectively represent the centerline axis of the field of view of each device 12, 12A, 12B.

Figure 5:
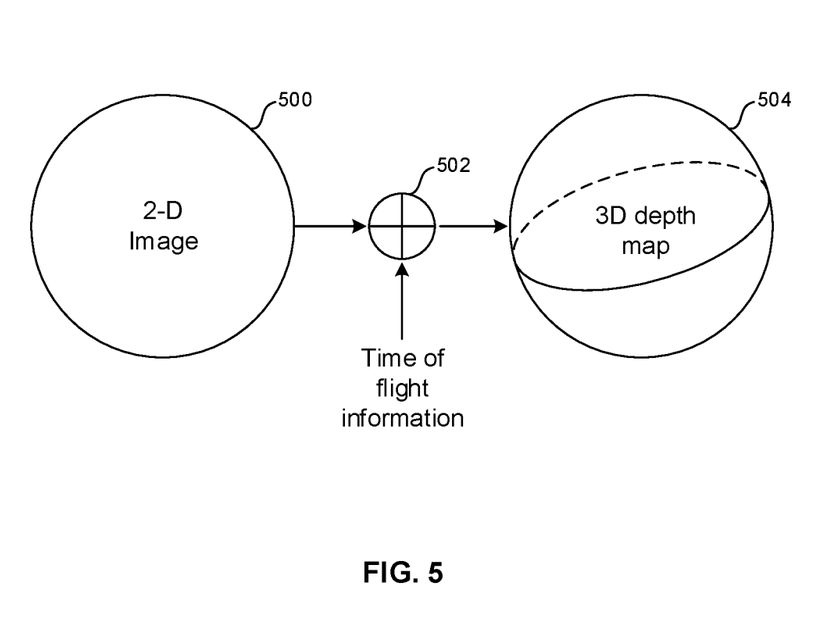
FIG. 5 schematically illustrates deriving a 3D depth map using time of flight (TOF) information combined with a 2D image from a camera.

FIG. 5 illustrates that an object such as a sphere may be imaged using a laser, with a 2D image 500 of the object being captured by a camera such as any of those discussed above. At 502 the 2D image 500 is combined with TOF information, e.g., on a pixel-by-pixel basis, to render a 3D depth map of the object, illustrated by the sphere 504.

As a non-limiting example, a laser can be pulsed to cause light to impinge on the object and be reflected back to an imager to establish a pixel of the 2D image 500. The TOF information for that pixel is associated with the pixel in a data structure. Then the laser can be pulsed again to cause light to impinge on the object and be reflected back to the imager to establish a second pixel of the 2D image 500. The TOF information for that second pixel is associated with the second pixel in a data structure, and so on, until the pixels of the 2D image have been established along with corresponding TOF information for generating the 3D depth map.

Figure 6:
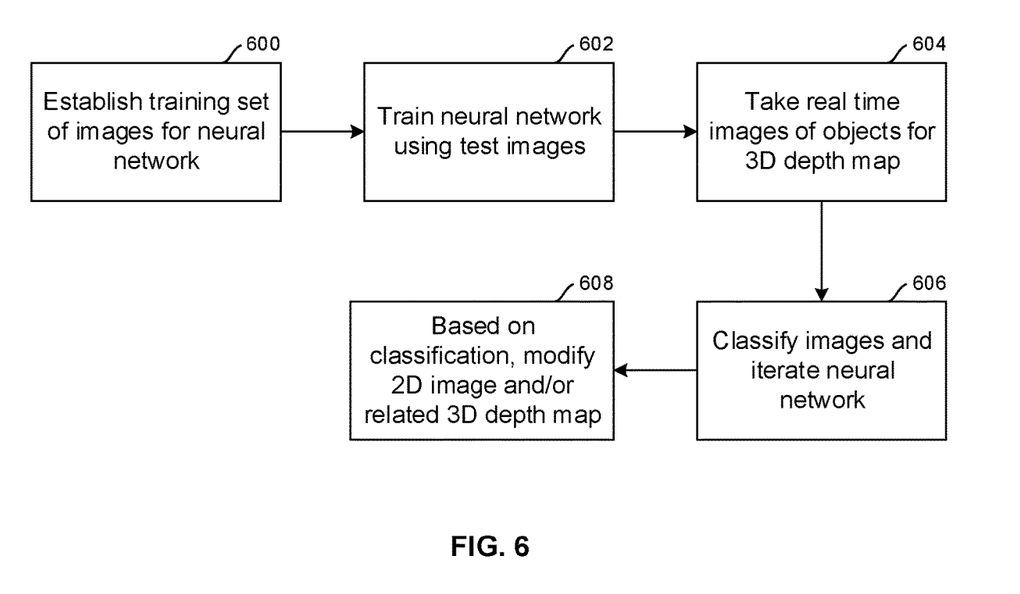
FIG. 6 is a flow chart of example logic consistent with present principles.

Turning to FIG. 6, an example machine learning algorithm that may be used consistent with present principles is that disclosed at http://adilmoujahid.com/posts/2016/06/introduction-deep-learning-python-caffe. At block 600, a training set required for the convolutional neural network (CNN) disclosed in the referenced publication may be populated by labeled images of objects expected to present themselves in the FOVs shown in example FIGS. 3 and 4. Moving to block 602, a test images is used to train based on the training set. The test set may include unlabeled images of objects. The test set may be thought of as a library of images, and the library can be added to for improving classification by building up the library. Images not resident in the test set also may be used. Specific steps related to data preparation, model definition, solver definition, model training, and prediction based on new data are set forth in the above publication. Transfer learning steps also are described.

The NVIDIA DIGITS tool disclosed at https://developer.nvidia.com/digits also can be used for creating the deep learning model (pre-trained CNN) using 2D images. The DIGITS tool can further train the CNN for image classification, segmentation, and object detection tasks by managing data, designing and training neural networks on multiprocessor systems, monitoring performance in real time with visualizations, and selecting a best performing model.

Proceeding to block 604, real time images are taken of objects according to principles discussed above to generate 2D images of the objects for combining with TOF data to render 3D depth maps. Using the neural network from block 602, at block 606 the images are classified, with feedback being provided if desired to the neural network to further refine classification accuracy. For example, if an image contains a line, with TOF information indicating that the line is a concave groove, the object may be classified as a long play (LP) record. To perform object identification in real time, the CAFFE Classifier disclosed at http://cafe.berkeleyvision.org can be used on both infrared (2D) and 3D depth images.

Moving to block 608, using the classification of the imaged object, the 2D image and/or 3D depth map may be modified to better conform to the type of classification from block 606. As an example, since the object is classified at block 606, at block 608 areas of the image that are noisy can be smoothed to reflect the appearance of the class of object identified at block 606.

To improve neural network performance, if the usage of the system is known, object information can be preloaded, as at block 600. This improves the initial operation of the system as an object data base would pre-exist. Similarly, as the system learns and augments its object data base, the device's data base can be uploaded to the cloud. Once in the cloud it can be shared with others. As an example, in the case of a subscription based gaming service, this would greatly improve the speed and accuracy of the classification.

While particular techniques and machines are herein shown and described in detail, it is to be understood that the subject matter which is encompassed by the present invention is limited only by the claims.

What is claimed is:

1. A first device comprising:
at least one processor configured with instructions to:
generate at least one image of a second device to render a first three dimensional (3D) depth map;
provide the first 3D depth map to an aggregator device configured to aggregate the first 3D depth map with a second 3D depth map generated by the second device using an image of the first device taken by the second device such that the first and second depth maps when aggregated include both the first and second devices;
classify a representation of at least a first object in at least one image used to render the first 3D depth map using a machine learning algorithm (MLA) to render a classification; and
use the classification to modify the representation.

2. The first device of claim 1, wherein the aggregator device comprises at least one of the first or second devices.

3. The first device of claim 1, wherein the aggregator device does not comprise either the first or second device.

4. The first device of claim 1, wherein the instructions are executable to generate the first 3D depth map at least in part by:
inputting to a machine learning algorithm (MLA) a training set of classified images; and
modifying MLA processing by inputting to the MLA a test set of unclassified images.

5. The first device of claim 1, comprising the aggregator device programmed with instructions to aggregate the first 3D depth map with the second 3D depth map such that the first and second depth maps when aggregated include both the first and second devices.

6. An assembly comprising:
plural motorized computerized devices in a system;
each motorized computerized device comprising at least one camera and at least one emitter configured to output signals useful for generating at least one three dimensional (3D) depth map by imaging an object to render a two dimensional (2D) image thereof, illuminating the object using the emitter, receiving time of flight (TOF) information using reflections from the object of light emitted by the emitter, and combining the 2D image with the TOF information to render the 3D depth map;
at least a first one of the motorized computerized devices being programmed with instructions to:
render an aggregated three dimensional (3D) depth map that is aggregated from the 3D depth maps from the motorized computing device, the aggregated depth map comprising images of plural of the motorized devices;
classify a representation of at least a first object in at least one image used to render the first 3D depth map using a machine learning algorithm (MLA) to render a classification; and
use the classification to modify the representation.

7. The assembly of claim 6, wherein the 2D image is combined with the TOF information on a pixel-by-pixel basis to render the 3D depth map.

8. The assembly of claim 6, wherein the instructions are executable to:
input to the MLA a training set of classified images; and
modify MLA processing by inputting to the MLA a test set of unclassified images.

9. A method comprising:
using an illuminator, illuminating an object;
using a camera, receiving reflections from the object;
using the reflections, establishing a representation of the object using a first device;
based at least in part on the representation, establish a first three dimensional (3D) depth map of the object; and
provide the first 3D depth map to an aggregator device that aggregates the first 3D depth map with a second 3D depth map generated by a second device, the 3D depth aggregated from the first and second 3D depth maps comprising images of the first and second devices, wherein the method includes:
classifying a representation of at least a first object in at least one image used to render the first 3D depth map using a machine learning algorithm (MLA) to render a classification; and
using the classification to modify the representation.

10. The method of claim 9, comprising modifying the representation using a neural network to render a modified representation using at least one computer processor.

11. The method of claim 9, wherein the representation is a two dimensional (2D) image of the object.

12. The method of claim 9, wherein the representation is a three dimensional (3D) depth map of the object.

13. The method of claim 10, comprising:
inputting to the neutral network a training set of classified images; and
modifying the neural network processing by inputting to the neural network a test set of unclassified images.

* * * * *